United States Patent
Lee

(10) Patent No.: US 6,398,894 B1
(45) Date of Patent: Jun. 4, 2002

(54) METHOD FOR MANUFACTURING A RUBBER BASKETBALL

(75) Inventor: Shao-Te Lee, Taoyuan Hsien (TW)

(73) Assignee: Yuan Lian Rubber Sporting Goods Mfg., Ltd., Taoyuan Hsien (TW)

( * ) Notice: Subject to any disclaimer, the term of this patent is extended or adjusted under 35 U.S.C. 154(b) by 0 days.

(21) Appl. No.: 09/503,908

(22) Filed: Feb. 15, 2000

(51) Int. Cl.⁷ .............................................. A63B 41/10
(52) U.S. Cl. ...................... 156/147; 156/170; 156/172; 156/245; 473/597; 473/605
(58) Field of Search ....................... 473/65, 610, 597, 473/604; 156/146, 147, 170, 172, 245

(56) References Cited

U.S. PATENT DOCUMENTS

| | | | | |
|---|---|---|---|---|
| 3,405,018 A | * | 10/1968 | Way ............................ | 156/147 |
| 4,187,134 A | * | 2/1980 | Svub et al. .................. | 156/170 |
| 4,191,375 A | * | 3/1980 | Uruba et al. ................ | 473/609 |
| 5,320,345 A | * | 6/1994 | Lai et al. .................... | 473/601 |
| 5,931,752 A | * | 8/1999 | Guenther et al. ........... | 473/597 |
| 6,142,897 A | * | 11/2000 | Lees ........................... | 473/604 |

* cited by examiner

Primary Examiner—Michael W. Ball
Assistant Examiner—Barbara J. Musser
(74) Attorney, Agent, or Firm—Rosenberg, Klein & Lee

(57) ABSTRACT

A method for manufacturing a rubber basketball is disclosed, which has the following steps: (a) supplying a sheet of rubber material in a suitable shape and size; (b) folding, compressing and cutting the rubber material to make the rubber material into a bladder; (c) mounting a valve in the bladder; (d) inflating the bladder with air and curing the bladder at a temperature from 130° C. to 150° C. for about 5 minutes; (e) wrapping at least one thread on the inflated bladder by a wrapping machine to form a wrapped layer with a suitable thickness and to pattern the bladder; (f) bonding relatively large multiple rubber sheets to the surface of the wrapped layer by a semi-automatic bonding machine; (g) making a groove at each junction between adjacent relatively large rubber sheets; (h) bonding a thinner and narrower strip than the relatively large multiple rubber sheets at each junction of adjacent rubber sheets; and (i) heating and curing the relatively large multiple rubber sheets together with the strips at a temperature from 130° C. to 150° C. for about 5 minutes in a mold having multiple protruding ribs defined therein to make a basketball, whereby the basketball possesses multiple, relatively concave depressions having two slanting walls defined therein.

4 Claims, 8 Drawing Sheets

METHOD FOR MANUFACTURING A RUBBER BASKETBALL

BACKGROUND OF THE INVENTION

1. Field of the Invention

The present invention relates to a method for manufacturing a rubber basketball, more particularly, to a method for manufacturing a rubber basketball containing a relatively rough surface capable of preventing the basketball from sliding.

2. Description of Related Art

With reference to FIG. 14, the conventional basketball includes a bladder (90) made of rubber, a wrapped layer (91) covering the outer surface of the bladder (90), an outer cover (92) covering the wrapped layer (91) and having some protrusions (93) and depressions (94) defined on the surface.

However, the conventional basketball has some difficulties. The depressions (94) defined on the outer cover (92) are too shallow to provide an effect on the contour of the outer cover (92) surface or to make a three-dimensioned basketball with an aesthetic appearance.

Another shortcoming found in the conventional basketball is that the depth of each depression (94) is relatively shallow so that it is not easy for the players who are playing with the conventional basketball to grasp it in their hands, and the conventional basketball intends to slide from the hands of players.

Therefore, there is still a need to resolve the above-mentioned difficulty and shortcoming.

SUMMARY OF THE INVENTION

The objective in accordance with the present invention is to provide a method for manufacturing a rubber basketball having a relatively rough surface capable of preventing the basketball from sliding out of the hands of the players.

To achieve the objective, the method of manufacturing a basketball in accordance with the present invention comprises:

(a) supplying a sheet of rubber material in a suitable shape and size;

(b) folding, compressing and cutting the rubber material to make the rubber material into a bladder;

(c) mounting a valve in the bladder;

(d) inflating the bladder with air and curing the bladder at a temperature from 130° C. to 150° C. for a period of time of about 5 minutes;

(e) wrapping at least one thread on the inflated bladder by a wrapping machine to form a wrapped layer with a suitable thickness and to pattern the bladder;

(f) bonding relatively large multiple rubber sheets, one adjacent to another, to the surface of the wrapped layer by a semi-automatic bonding machine;

(g) making a groove between any two of the adjacent rubber sheets;

(h) bonding a strip having a thinner and narrower size than the relatively large multiple rubber sheets at each junction of adjacent rubber sheets; and (i) heating and curing the relatively large multiple rubber sheets together with the strips at a temperature from 130° C. to 150° C. for about 5 minutes in a mold having multiple protruding ribs defined therein to make a basketball, whereby the basketball possesses multiple, relatively concave depressions having two slanting walls defined therein.

Other objectives, advantages, and novel features of the invention will become more apparent from the following detailed description when taken in conjunction with the accompanying drawings.

DETAILED DESCRIPTION OF THE PREFERRED EMBODIMENT

The preferred embodiment of the method for manufacturing a rubber basketball in accordance with the present invention comprises the following steps:

(a) supplying a sheet of rubber material in a suitable shape and size;

(b) folding, compressing and cutting the rubber material to make the rubber material into a bladder;

(c) mounting a valve in the bladder;

(d) inflating the bladder with air and curing the bladder at a temperature from 130° C. to 150° C. for about 5 minutes;

(e) wrapping at least one thread onto the inflated bladder by a wrapping machine to form a wrapped layer with a suitable thickness and to pattern the bladder;

(f) bonding relatively large multiple rubber sheets, one adjacent to another, the surface of the wrapped layer by a semi-automatic bonding machine;

(g) making a groove between any two of the adjacent relative largely rubber sheets;

(h) bonding a thinner and narrower strip than the relative largely multiple rubber sheets at each junction of adjacent rubber sheets; and (i) heating and curing the relatively large multiple rubber sheets together with the strips at a temperature from 130° C. to 150° C. for about 5 minutes in a mold having multiple protruding ribs defined therein to make a basketball, whereby the basketball possesses multiple, relatively concave depressions having two slanting walls defined therein.

Figure 1:
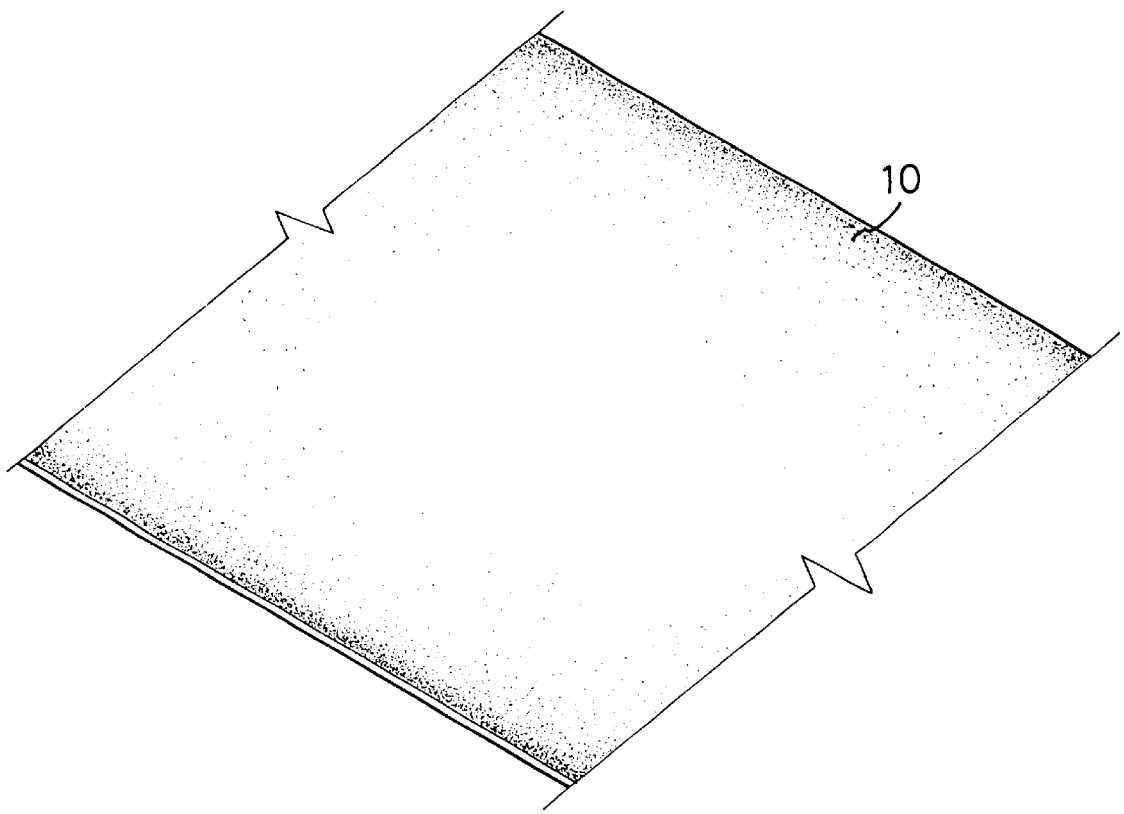
FIG. 1 is a perspective view of the rubber material used in the method for manufacturing a rubber basketball in accordance with the present invention.

In step (a) and with reference to FIG. 1, a rubber material (10) in suitable shape of sheet and with a suitable size is provided.

Figure 2:
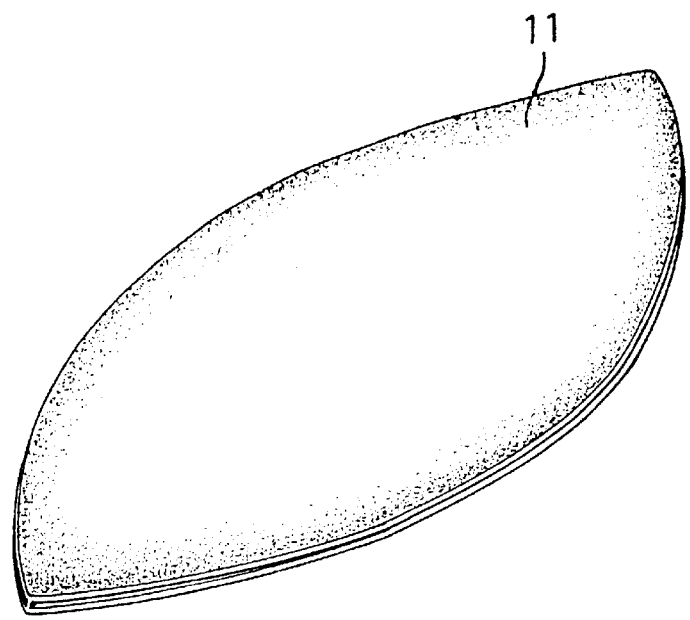
FIG. 2 is a perspective view of the bladder made by cutting the rubber material in FIG. 1.

In step (b) and with reference to FIG. 2, the rubber material (10) is folded, compressed and cut to make the rubber material (10) into a bladder (11).

Figure 3:
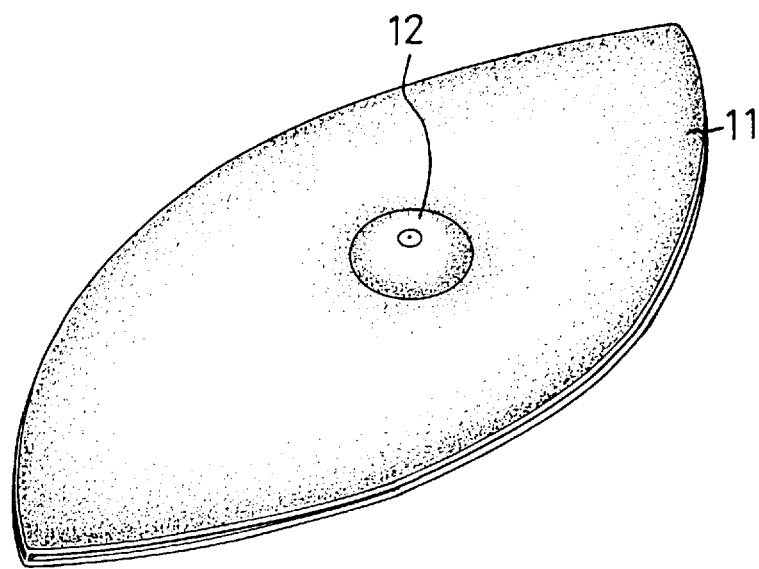
FIG. 3 is a perspective view of the bladder of FIG. 2 after mounting a valve therein.

In step (c) and with reference to FIG. 3, a valve (12) is added to the bladder (11).

Figure 4:
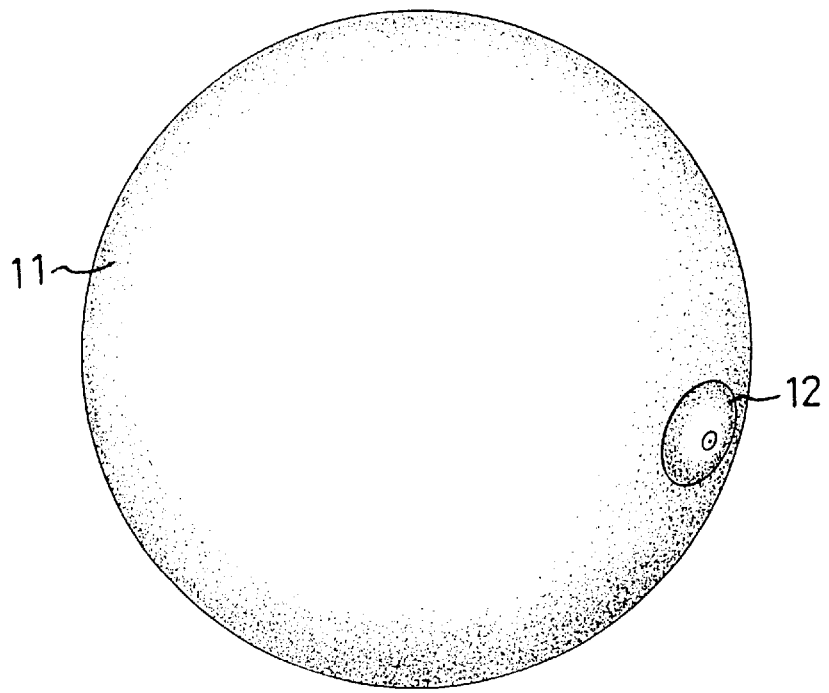
FIG. 4 is a perspective view of the bladder of FIG. 3 after being inflated with air.

In step (d) and with reference to FIG. 4, after adding the valve (12) to the bladder (11), the bladder (11) is inflated with air and then is cured at a temperature from 130° C. to 150° C. for about 5 minutes.

Figure 5:
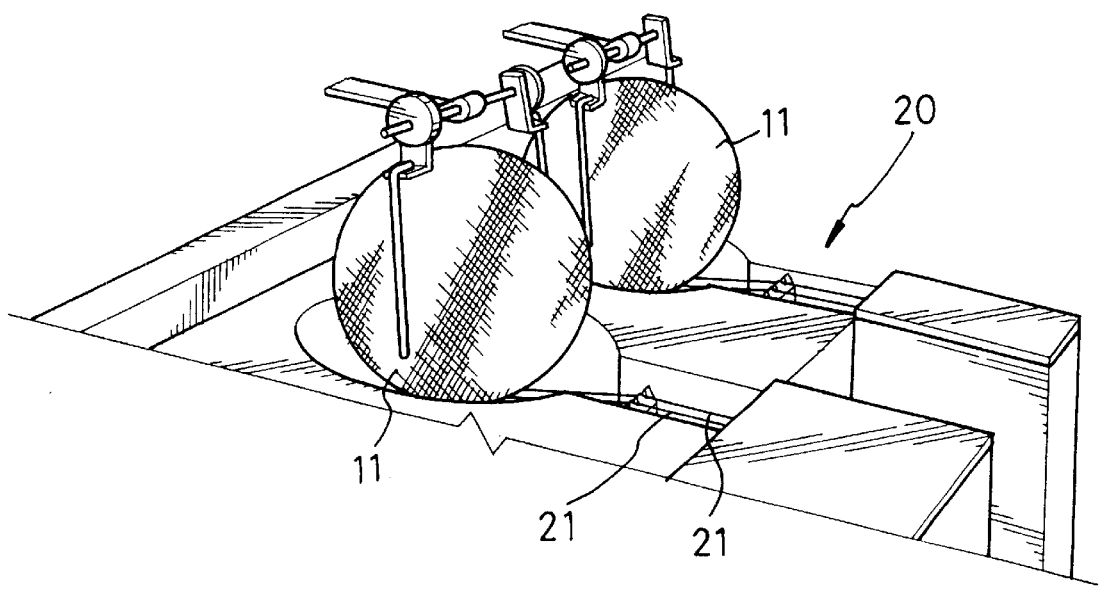
FIG. 5 is a perspective view of the bladder of FIG. 4 being wrapped with a string wrapper.

In step (e) and with reference to FIG. 5, at least one thread (21), for example 1, 3 or 5 strings of thread (21), are respectively wrapped onto the surface of the bladder (11), after being inflated, by a wrapping machine (20) which is controlled by a computer to form a wrapped layer (22) with a suitable thickness on the bladder (11) surface and to pattern the bladder (11). The number of the strings of the thread depend on the sphericity requirement for the basketball.

Figure 7:
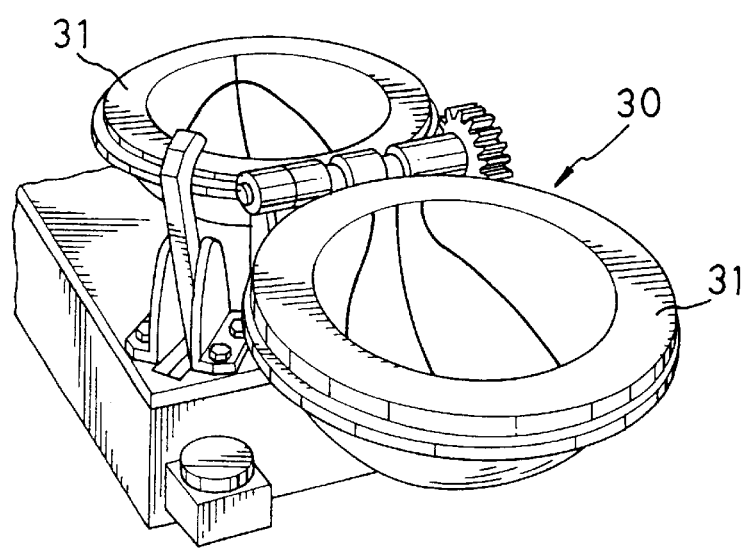
FIG. 7 is a perspective view of the semi-automatic bonding machine used in the method for manufacturing a rubber basketball in accordance with the present invention.
Figure 6:
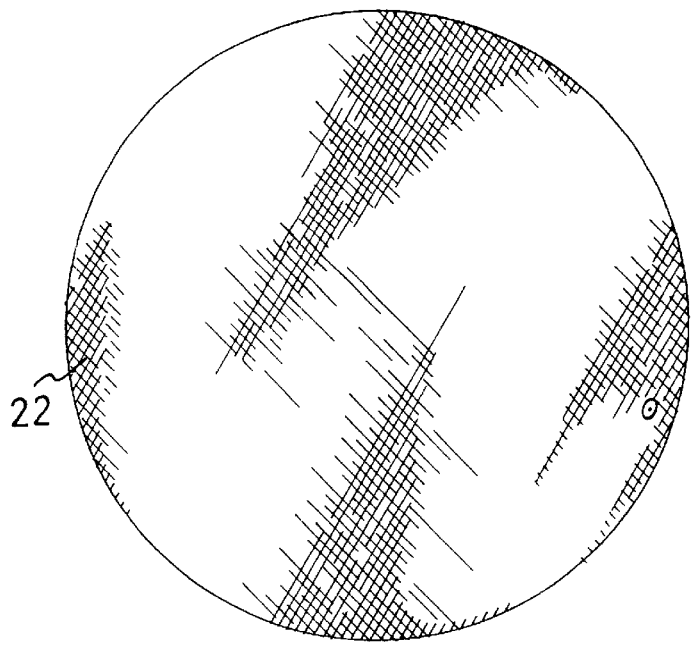
FIG. 6 is a perspective view of the bladder of FIG. 5 after being wrapped with a string wrapper.

In step (f) and with reference to FIG. 7, a semi-automatic bonding machine (30) is used to bond relatively large multiple rubber sheets (40) to the surface of the wrapped layer (22). The semi-automatic bonding machine (30) comprises two semi-molds (31). When step (f) is carried out, multiple relatively large rubber sheets (40), one adjacent to another, are bonded to each semi-mold (31) by a tape possessing adhesive on both sides. Then the inflated bladder (11) with the wrapped layer (22) is put inside one of the semi-molds (31) and then the two semi-molds (31) are closed into a spherical mold applying compression to the rubber sheets (40) and the inflated bladder (11).

Figure 8:
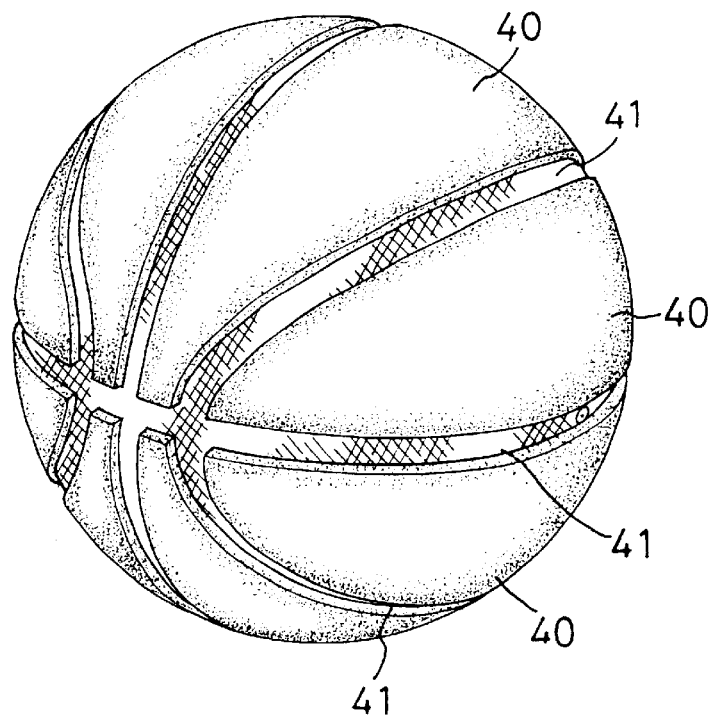
FIG. 8 is a perspective view of a semi-finished product of the method for manufacturing a rubber basketball in accordance with the present invention after the relatively large multiple rubber sheets are bonded to the surface of the wrapped layer covering the bladder of FIG. 6.

With reference to FIG. 8, after step (f), a semi-finished product made in accordance with the present invention is formed, which comprises multiple rubber sheets (40) bonded on the wrapped layer (22).

Figure 9:
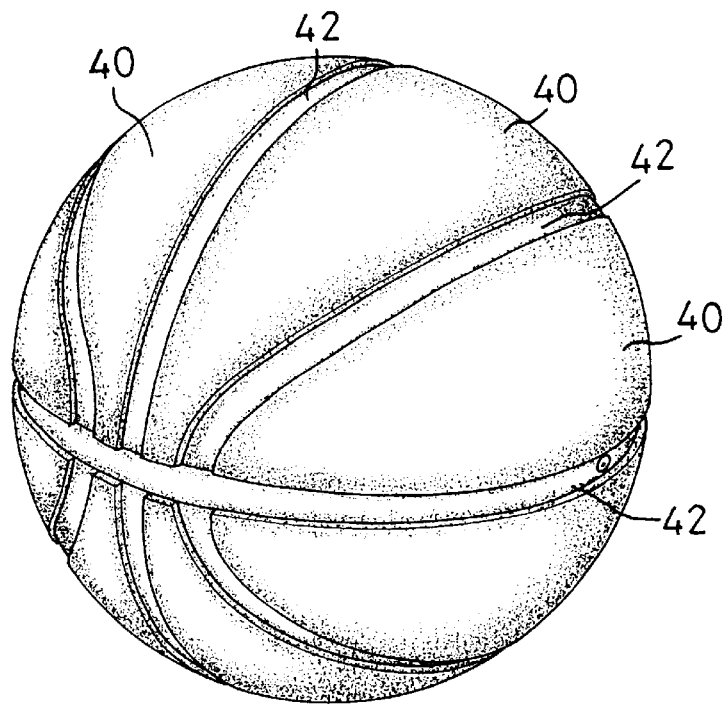
FIG. 9 is a perspective view of a semi-finished product in FIG. 8 after strips have been bonded to each junction between adjacent relatively large rubber sheets.

In step (g) and with reference to FIG. 9, a groove (41) is formed between any two of the adjacent relatively large rubber sheets (40).

Then, in step (h), a rubber strip (42) narrower and smaller than the relatively large rubber sheet (40) is attached to cover each groove (41).

Figure 12:
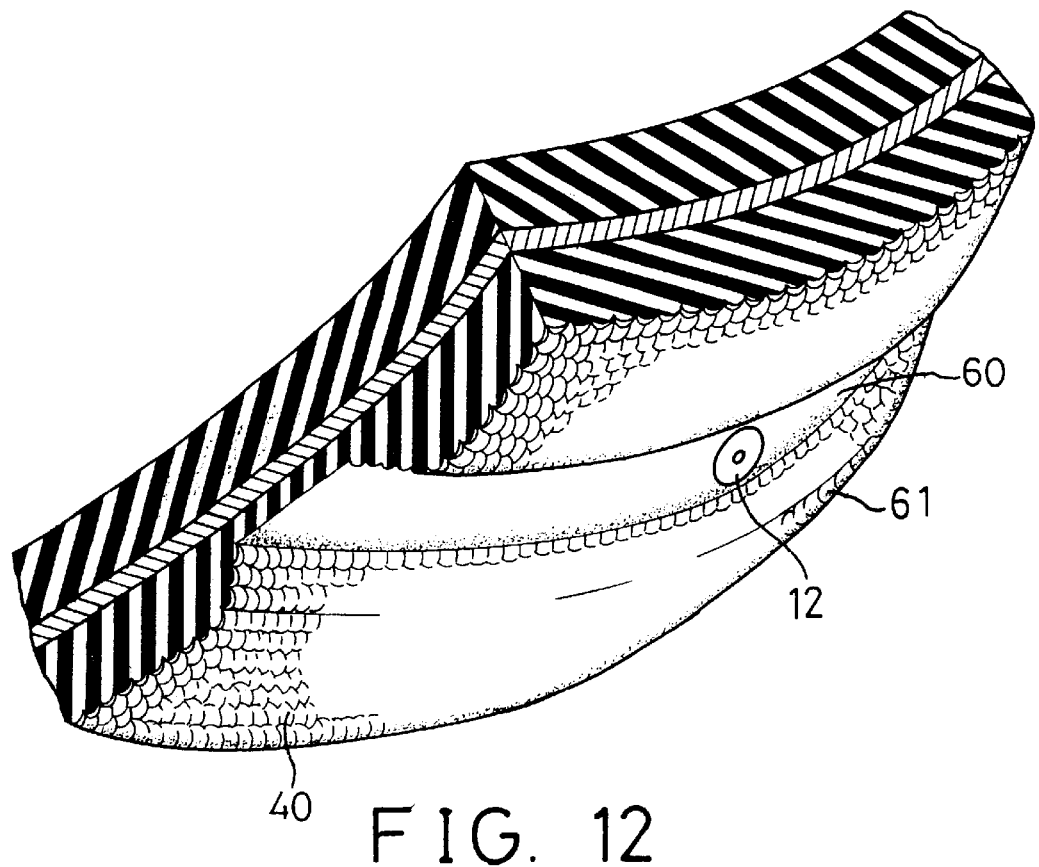
FIG. 12 is an enlarged partial perspective view of a basketball made by the method for manufacturing a rubber basketball in accordance with the present invention.
Figure 10:
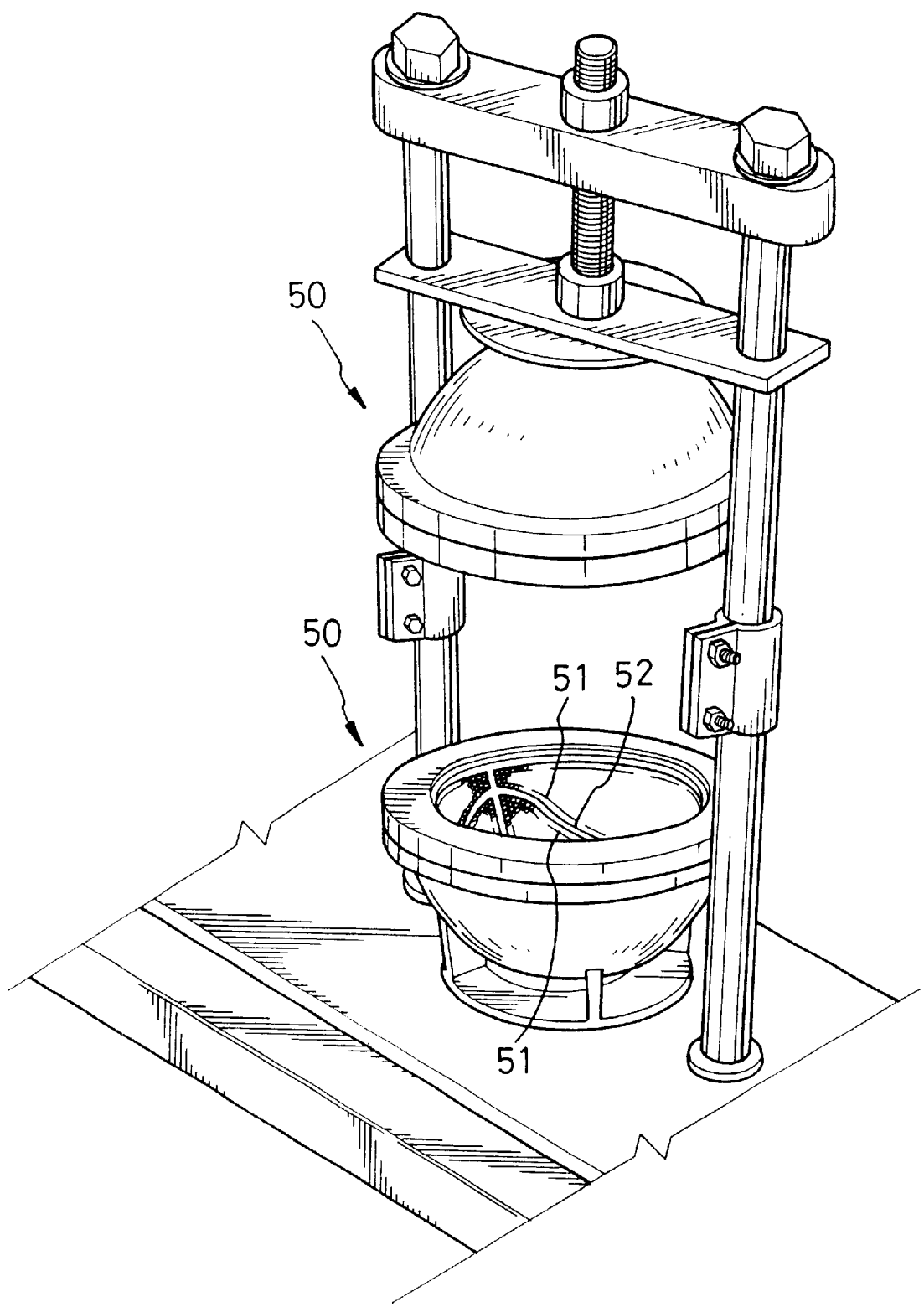
FIG. 10 is a perspective view of a mold used in the method for manufacturing a rubber basketball in accordance with the present invention to pattern the basketball.
Figure 11:
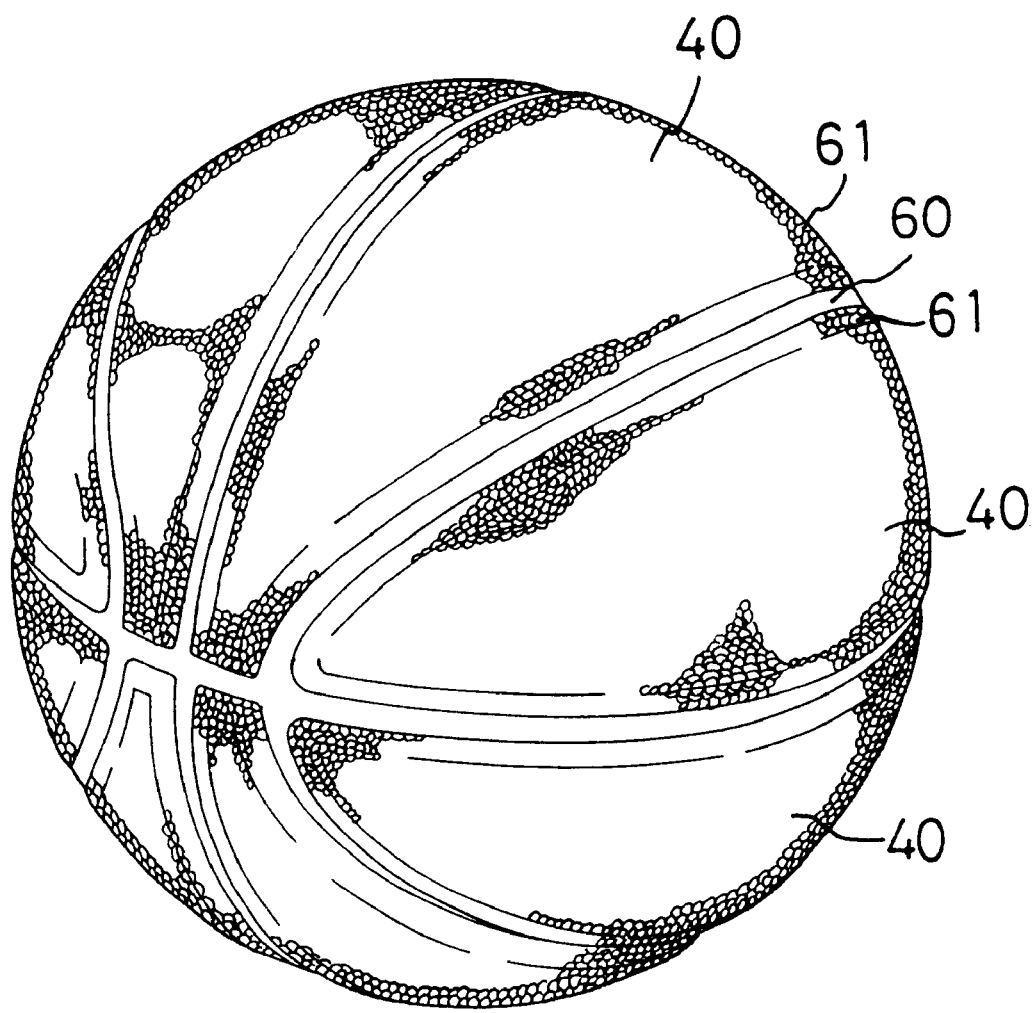
FIG. 11 is the final product of a basketball made by the method for manufacturing a rubber basketball in accordance with the present invention.
Figure 13:
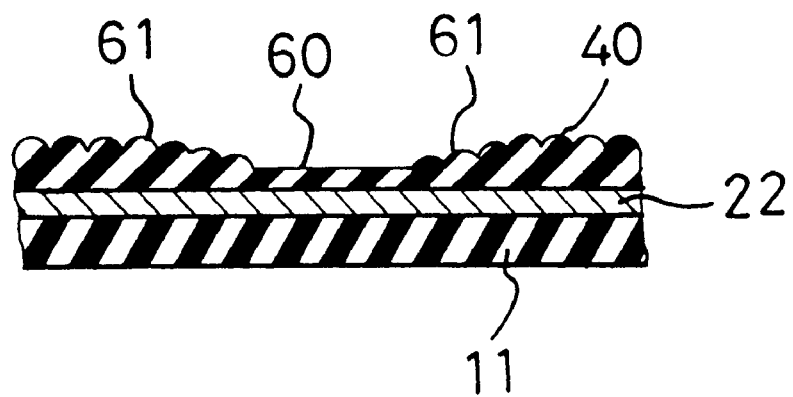
FIG. 13 is an enlarged cross-sectional partial side plan view of a basketball made by the method for manufacturing a rubber basketball in accordance with the present invention.
Figure 14:
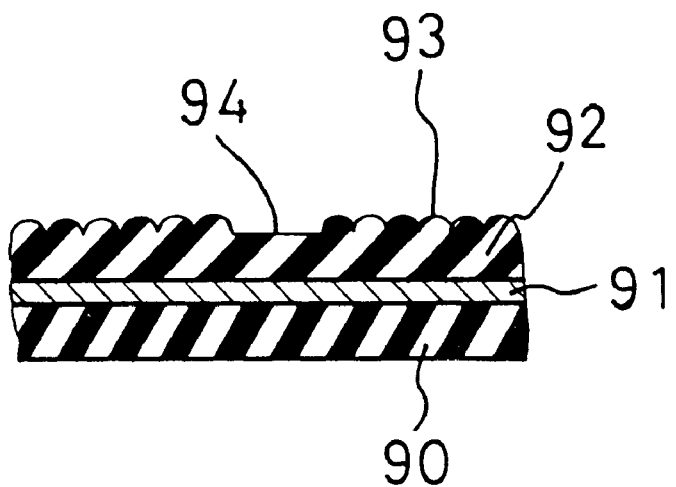
FIG. 14 is an enlarged cross-sectional partial side plan view of a conventional basketball.

In step (i) and with reference to FIG. 10, the semi-finished product made in step (h) is heated and cured in a mold (50) at a temperature from 130° C. to 150° C. for about 8 to 9 minutes. The mold (50) comprises several protruding cants (51) defined therein. A protruding rib (52) is defined between any two of the cants (51),. Thus, the rubber basketball, after being heated and cured in the mold (50), will possess several depressions (60) (see FIGS. 11 to 13) each having a relatively concave configuration and each depression (60) comprises two slanting walls (61).

With the special design in the depressions (60) and the slanting walls (61), the surface of the basketball is in sharp contrast among the protrusions and the concavities, and the dimension of the surface is more stereoscopic and aesthetic. A player can control the basketball more easily. Therefore, an advantage is that a player can more easily keep the basketball in the hands to prevent the basketball from sliding from the hands.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a rubber basketball, comprising:

(a) supplying a sheet of rubber material in a predetermined shape and size;

(b) folding, compressing and cutting the rubber material to make the rubber material into a bladder;

(c) mounting a valve in the bladder;

(d) inflating the bladder with air and curing the bladder at a temperature from 130° C. to 150° C. for a period of time approximating 5 minutes;

(e) wrapping the inflated bladder with at least one thread using a wrapping machine to form a wrapped layer having a predetermined thickness and to pattern the bladder;

(f) bonding relatively large multiple rubber sheets, one adjacent to another in spaced relationship to define a groove therebetween, directly to an exterior surface of the wrapped layer using a semi-automatic bonding machine;

(g) bonding a thinner and narrower strip than the relatively large multiple rubber sheets in the groove at each junction of adjacent rubber sheets; and (h) heating and curing the relatively large large multiple rubber sheets together with the strips at a temperature from 130° C. to 150° C. for a period of time approximating 5 minutes in a mold having multiple protruding ribs defined therein disposed in aligned relationship with said grooves to make a basketball, each of the multiple protruding ribs having inclined sides, whereby the basketball possesses multiple, relatively concave depressions comprising two slanting side walls to provide a more grippable basketball surface.

2. The method for manufacturing a rubber basketball as claimed in claim 1, wherein one thread is used in step (e).

3. The method for manufacturing a rubber basketball as claimed in claim 1, wherein three threads are used in step (e).

4. The method for manufacturing a rubber basketball as claimed in claim 1, wherein five threads are used in step (e).

* * * * *